Figure 1:
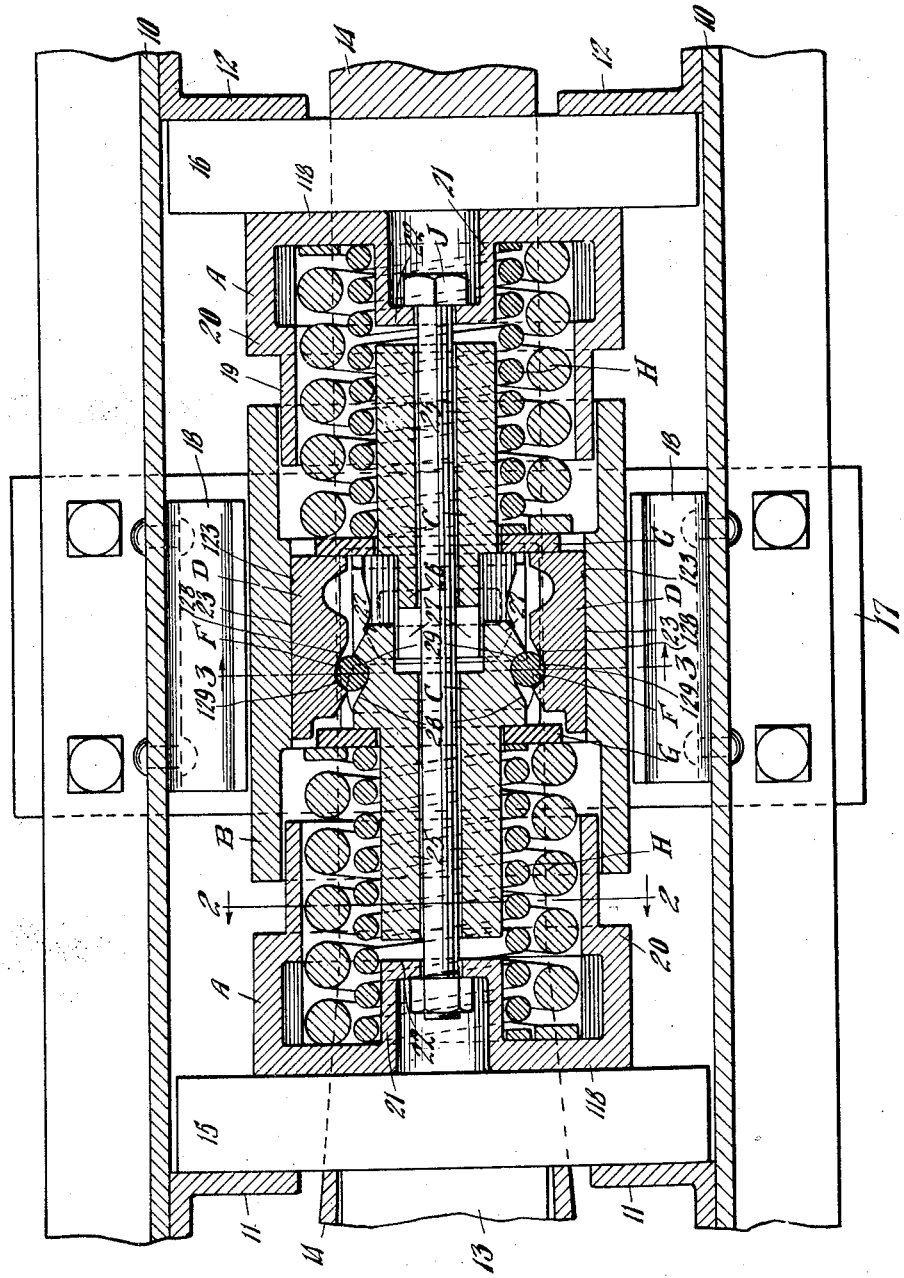

Dec. 20, 1927.  
J. F. O'CONNOR  
1,653,224  
FRICTION SHOCK ABSORBING MECHANISM  
Filed July 11, 1924   2 Sheets-Sheet 1

Witnesses  
Wm. Geiger

Inventor  
John F. O'Connor  
By George J. Haight  
His Atty.

Dec. 20, 1927.
J. F. O'CONNOR
1,653,224
FRICTION SHOCK ABSORBING MECHANISM
Filed July 11, 1924    2 Sheets-Sheet 2
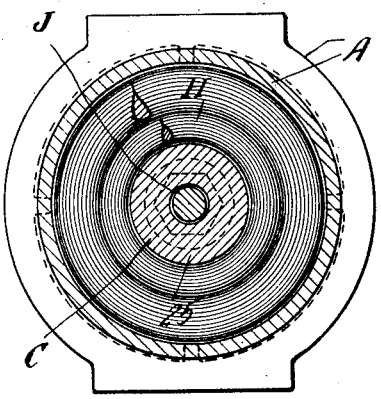
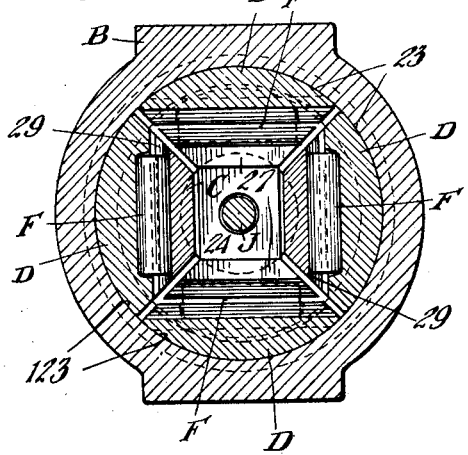
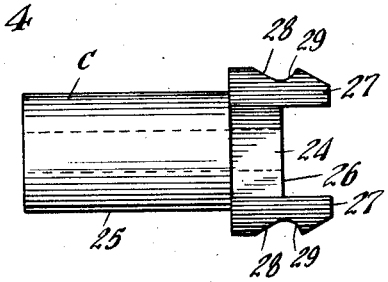
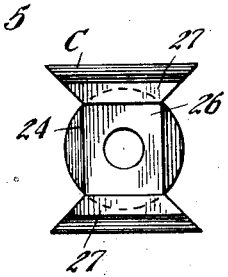
Witnesses
Wm. Geiger
Inventor
John F. O'Connor
By George I. Haight
His Atty.

Patented Dec. 20, 1927.

1,653,224

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 11, 1924. Serial No. 725,329.

This invention relates to improvements in friction shock absorbing mechanisms.

One object of the invention is to provide a friction shock absorbing mechanism of high capacity, especially adapted for draft riggings, having an initial, relatively light resistance and a relative high capacity during the remainder of the compression stroke, wherein the initial resistance is effected by spring elements, the resistance being augmented by a friction wedge system and by a more rapid compression of the spring resistance elements during the remainder of the compression stroke.

Another object of the invention is to provide a friction shock absorbing mechanism of the character indicated, of the double ended type, including relatively movable followers, tandem arranged springs and a friction wedge system, wherein during the initial compression of the mechanism the shocks are absorbed by the tandem springs, the arrangement being such that the tandem springs are available after each compression stroke to absorb the shocks, the main followers being returned to normal position directly by the expansion of the tandem springs, independently of the release of the friction elements.

Other objects and advantages of the invention will more clearly and fully appear from the description and claims hereinafter following.

In the drawings, forming a part of this specification, Figure 1 is a longitudinal, horizontal, sectional view of a railway draft rigging, showing my improvements in connection therewith. Figures 2 and 3 are transverse, vertical, sectional views of the shock absorbing mechanism proper, corresponding respectively, to the lines 2—2 and 3—3 of Figure 1. Figure 4 is a detail, side elevational view of a wedge pressure transmitting member, used in connection with my improved mechanism and Figure 5 is a detail, end elevational view of the wedge pressure transmitting member shown in Figure 4, looking toward the left in said figure.

In said drawings, 10—10 indicate channel-shaped center or draft sills of a railway car underframe to the inner faces of which are secured front stop lugs 11—11 and rear stop lugs 12—12. The inner end portion of the drawbar is indicated by 13, to which is attached a hooded yoke 14 of the usual construction. The shock absorbing mechanism, together with the front follower 15 and the rear follower 16 are supported within the yoke. The movable parts of the draft rigging are supported in operative position by a detachable saddle plate 17. The shock absorbing mechanism is of that type having a cylindrical friction shell, and to maintain the same properly centered, combined side guides and spacing members 18 are secured to the inner faces of the respective draft sills.

The improved shock absorbing mechanism proper, comprises, broadly, front and rear casings A—A; a friction shell B; front and rear wedge members C—C; two pairs of friction wedge shoes D—D; anti-friction rollers F; a pair of spring followers G—G; tandem arranged spring resistance elements H—H; and a retainer bolt J.

The front and rear casings A, which are of like construction, are of substantially cylindrical form. Each of the casings A is open at its inner end and is provided with a transverse, vertical end wall 118 at the outer end thereof cooperating with the corresponding main follower. The inner end of each casing is of reduced diameter as indicated at 19, thereby providing a continuous annular stop shoulder 20. Inwardly projecting from the end wall 118 of each casing is a hollow, cylindrical boss 21 having a flat end face 22 forming an abutment, for a purpose hereinbefore described.

The cylindrical friction shell B is interposed between the front and rear casings and is open at its opposite ends and is adapted to telescopically receive the reduced end portions of the front and rear casings A. Midway between its ends, the shell B is of reduced internal diameter, thereby presenting a longitudinally disposed cylindrical friction surface 23, with which the friction wedge shoes D are adapted to cooperate. The shell B is of such a length that the opposite ends thereof will be brought into abutment with the annular shoulders 20 of the front and rear casings A when the mechanism is fully compressed, thereby transmitting the force directly through the casings A, shell B and front and rear followers to the corresponding stop lugs.

The two wedge members C are of like construction and are oppositely arranged, one functioning as a front wedge and the other as a rear wedge. Each wedge C comprises a head portion 24 at the inner end thereof and a cylindrical post 25 outwardly projecting therefrom and axially disposed. Each head comprises a central portion 26 having parallel side faces. The head is also provided with a pair of oppositely disposed enlargements 27—27 which serve as wedge elements proper. The head of each wedge C is cut away between the enlargements 27, as clearly shown in Figures 4 and 5, to slidingly accommodate the corresponding central portion of the head 24 of the outer wedge member. The enlargements of each head have the side faces thereof disposed in planes radial to the axis of the mechanism, so that the two heads will interfit and be guided by each other, sufficient clearance being provided between the faces to permit of free longitudinal movement of said heads. As clearly shown in Figures 1 and 3, the two wedges C are so disposed, that the enlargements 27 of the front wedge are in vertical alignment and the enlargements of the rear wedge are in horizontal alignment. The head of each wedge has a pair of wedge faces 28 on opposite sides thereof converging inwardly toward the axis of the mechanism, one of said faces being provided on each enlargement 27 of the head of the wedge. Each of the faces 28 is provided with a seat or shoulder 29 at the inner end thereof which forms an abutment to limit the movement of the corresponding anti-friction roller. The post of each wedge member C is of such a length that the outer end thereof is normally slightly spaced from the abutment face 22 of the boss 21 of the corresponding casing A. The inner ends of the enlargement 27 provide abutment shoulders on which the corresponding spring follower ring G is adapted to bear.

The wedge shoes D are four in number and are arranged in pairs, one pair cooperating with the front wedge member, and the other pair cooperating with the rear wedge member. The shoes D are of like construction, each shoe being provided with a wedge face 128 on the side thereof nearest the axis of the mechanism, the wedge face of each shoe having a roller seat 129 at the one end thereof. The pairs of wedge shoes cooperating with the respective wedge members are reversely arranged, and an anti-friction roller F is interposed between the wedge faces 128 and 28 of the corresponding shoe and wedge member. On the opposite side to that on which the wedge faces is located, each shoe has a cylindrical friction surface 123 adapted to cooperate with a section of the interior friction surface 23 of the shell B, the shoes cooperating with the front wedge, having their rear ends bearing on the rear spring follower ring G and the pair of shoes cooperating with the rear wedge C having their front ends bearing on the front spring follower G.

The spring resistance elements H, which are tandem arranged, each comprises a relatively light inner coil and a relatively heavier outer coil, interposed between the outer end wall 118 of the corresponding casing, and the spring follower ring G at the corresponding end of the mechanism.

The retainer bolt J has its opposite ends anchored in the hollow bosses 21 of the front and rear casings respectively, and the shank of the bolt extends through aligned openings in the front and rear wedge members C.

In the normal position of the parts, which is that shown in Figure 1, the opposite ends of the friction shell are spaced from the shoulders 20 of the front and rear casings A, the front and rear posts 25 of the wedges C are slightly spaced from the corresponding bosses of the front and rear casings A, and the front and rear spring follower rings abut the corresponding wedge friction shoes and the inner ends of the heads of the corresponding wedge members C.

In the operation of my improved shock absorbing mechanism, assuming an inward or buffing movement of the drawbar, the front casing A will be moved inwardly with the front follower 15, compressing the front spring resistance element H, forcing the pair of wedge shoes cooperating with the rear wedge C rearwardly, the wedge being resisted in its movement by the rear spring resistance element H. A wedging action will thus be set up between the rear wedge and the corresponding pair of wedge shoes, forcing the same into intimate contact with the interior friction surface of the shell B. There will thus be a tendency of the shell B to be forced rearwardly. At the same time, due to the rearward movement of the friction shell and the wedging system as a unit, the rear spring H will also be compressed and oppose rearward movement of the pair of wedge friction shoes cooperating with the front wedge C. It will be noted that during this time the front and rear springs function substantially in the manner of a single spring unit having the capacity of only a single spring. As the front wedge C is carried rearwardly by engagement with the front spring follower ring G, a wedging action will also be set up between the front wedge C and the cooperating pair of friction wedge shoes. The preliminary action thus described continues until the front and rear spring resistance elements H are compressed to such an extent that the abutment faces 22 of the bosses 21 of the front and rear casings A engage the outer ends of the corresponding posts 25 of the wedges C, whereupon further relative movement of the followers 15 and 16 will cause wedges C to move relatively to each other, effecting movement of the two pairs of friction shoes C with reference to each other and with reference to the friction shell, greatly augmenting the resistance offered. It will be evident that during the relative movement of the friction shoes the forces will be transmitted through the shoes from the respective followers to the inner ends of the front and rear spring resistance elements causing the springs to act in tandem. Relative movement of the front and rear casings A will be arrested, upon full compression of the mechanism, by the shoulders 20 coming into abutment with the opposite ends of the friction shell as hereinbefore pointed out, the force being then transmitted directly through the shell, casings and followers to the corresponding stop lugs. The parts are so proportioned that the inner end faces of the cut away portions of the heads 24 of the wedge members C will be brought into abutment simultaneously with the engagement of the casings A with the shell B, the wedge members C, together with the post 25 and the bosses 21, acting as a pressure transmitting column.

During draft, the action will be substantially the reverse of that just described, the rear follower being moved toward the front follower which is held stationary.

When the actuating pressure is reduced the initial releasing action will be an outward movement of the front and rear casings A, the tandem springs H being free to expand independently of the release of the friction system. The outward movement of the casings A will relieve the pressure on the wedge members C, thereby reducing the wedging action and permitting release of the parts of the friction system, expansion of the front and rear springs H moving the respective pairs of friction shoes in opposite directions, the shoes in turn acting to restore the corresponding wedges C. Outward movement of the wedges C is limited by the inner ends of the heads of the wedge members coming into engagement with the corresponding spring follower rings G.

In this connection, it is pointed out that in the event that for any reason, the friction wedge system becomes jammed, the front and rear spring elements H will be free to return the casings A to normal position, and will thus be available to absorb the succeeding shock. In other words, jamming of the friction wedge system will not in any way affect the operation of the tandem arranged springs, but the mechanism will still function as shock absorbing mechanism, operating substantially as a spring gear.

I have herein shown and described what I now consider the preferred manner of carrying out the invention, but the same is merely illustrative, and I contemplate all changes and modifications that come within the scope of the claims appended hereto.

I claim:

1. In a friction shock absorbing mechanism, the combination with front and rear follower acting elements, relatively movable toward and away from each other; of tandem arranged springs interposed between said followers; friction means interposed between said tandem arranged springs, said friction means including two sets of wedge shoes and a wedge cooperating with each set of shoes, said wedge having a pressure transmitting post thereon adapted to be actuated by the corresponding follower acting member.

2. In a friction shock absorbing mechanism, the combination with front and rear follower acting members, relatively movable toward and away from each other; tandem arranged spring elements interposed between said followers; a friction shell having a cylindrical interior friction surface; a plurality of friction shoes having cylindrical friction surfaces cooperating with the cylindrical surface of said shell; said shoes being arranged in reversely movable pairs, each pair cooperating with one of said tandem spring elements; wedge means cooperating with each of said shoes; and cooperating means on said wedges and follower members for effecting relative movement of said wedges.

3. In a friction shock absorbing mechanism, the combination with front and rear follower acting members, relatively movable toward and away from each other; tandem arranged spring elements interposed between said followers; a friction shell having a cylindrical interior friction surface; a plurality of friction shoes having cylindrical friction surfaces cooperating with the cylindrical surface of said shell, said shoes being arranged in reversely movable pairs, each pair cooperating with one of said tandem spring elements; and wedge means cooperating with each of said shoes, each wedge having a post thereon adapted to be engaged by one of said follower members to actuate said wedge upon relative approach of said follower members.

4. In a friction shock absorbing mechanism, the combination with front and rear followers, relatively movable toward and away from each other; tandem arranged springs interposed between said followers; of a friction shell having a cylindrical interior friction surface; and means interposed between said springs, actuated upon relative movement of said followers for forcing said springs apart, said means including simultaneously operative pressure-transmitting members independently engaged and actuated by each follower and a plurality of relatively movable friction elements co-operating with the cylindrical friction surface of the shell.

5. In a friction shock absorbing mechanism, the combination with front and rear followers relatively movable toward and away from each other; of tandem arranged spring elemets interposed between said followers, one of said springs being associated with each follower; a pressure transmitting post cooperating with each follower, said posts being engaged by said followers and moved relatively to each other upon relative movement of said followers; friction shoes having wedging engagement respectively with said posts; and a lateral pressure resisting member having a friction surface engaged by said shoes, said shoes cooperating with the inner ends of said tandem springs respectively to compress the same upon relative approach of said followers.

6. In a friction shock absorbing mechanism, the combination with front and rear followers, said followers having axial abutment members thereon; of a friction shell interposed between said followers; a friction system within the shell, said system being interposed beween said followers, said system including front and rear relatively movable wedge members and co-operating sets of friction shoes, each of said wedge members having pressure transmitting means extending outwardly therefrom and adapted to be engaged by the abutment means of one of said followers to actuate the corresponding wedge member and effect movement thereof with respect to the other wedge member; and yielding movement resisting means interposed between the followers and the respective sets of shoes.

7. In a friction shock absorbing mechanism, the combination with front and rear follower acting means; of a friction shell interposed between said follower acting means, said shell having a longitudinally disposed, interior, cylindrical friction surface; tandem springs interposed between said follower acting means; front and rear spring followers cooperating with the inner ends of said tandem springs; a circular series of friction shoes within the shell, interposed between said spring followers, alternate shoes of said series engaging the front spring follower and the remaining shoes engaging the rear spring follower; and means for actuating said shoes and placing the same under lateral pressure, said means including front and rear wedge members adapted to be actuated by the front and rear follower acting means respectively, each of said wedge members cooperating with alternate shoes.

8. In a friction shock absorbing mechanism, the combination with front and rear follower acting members relatively movable toward and away from each other; of a longitudinally disposed friction member having opposed curved friction surfaces; spring resistance elements interposed between said follower acting members, one of said elements being associated with each follower acting member; and pressure-transmitting means interposed between each follower acting member and the inner end of the spring resistance associated with the other follower acting member, each pressure-transmitting means including a plurality of friction elements co-operating with the curved friction surfaces of said friction member.

9. In a friction shock absorbing mechanism, the combination with front and rear follower acting elements relatively movable toward and away from each other; of tandem arranged springs interposed between said follower elements; and friction means interposed between said tandem arranged springs, said means including a friction shell, two sets of friction elements and lateral pressure creating means for each set of elements, each set of friction elements and lateral pressure-creating means being actuated by the follower at the end opposite the coacting tandem element during compression of the mechanism and yieldingly resisted by the other of said tandem arranged elements, while so actuated.

10. In a friction shock absorbing mechanism, the combination with front and rear follower acting members, relatively movable toward and away from each other; of tandem arranged spring elements interposed between said follower acting members; a plurality of longitudinally disposed, relatively movable friction shoes interposed between said tandem arranged springs, certain of said shoes having their movement opposed by one of said tandem elements and the remaining shoes having their movement opposed by the other tandem element; a floating friction shell interposed between said follower acting members, said shell having an interior friction surface with which said shoes co-operate; and means for pressing said shoes against said surface, said means including a pair of relatively movable lateral wedge pressure creating members, each adapted to be actuated by the follower acting member at the end opposite the coacting tandem element and effect relative movement of said shoes upon relative movement of said follower acting members.

11. In a friction shock absorbing mechanism, the combination with front and rear follower acting members relatively movable toward and away from each other; of tandem arranged spring elements interposed between said follower acting members, one of said spring elements being associated with each follower acting member; a wedge pressure transmitting member engageable with each follower acting member to effect movement therewith, one of said wedge pressure transmitting members being actuated by the follower acting member at the end opposite the coacting tandem element and the other wedge pressure transmitting member being actuated by the other follower member; a friction wedge shoe co-acting with each wedge pressure transmitting member and adapted to be moved by the latter during relative movement of the front and rear follower acting members to apply pressure to the inner ends of said tandem springs; and a lateral pressure resisting member co-operating with said shoes.

12. In a friction shock absorbing mechanism, the combination with front and rear follower acting members; of a friction shell interposed between said follower acting members, said shell having two sets of longitudinally disposed, opposed, interior friction surfaces; yielding movement resisting means cooperating with each follower acting member, and friction means interposed between said follower acting members, said means including friction shoes arranged in pairs and cooperating with said means and wedge members engageable respectively with said follower acting wedge members, each cooperating with one of said pairs of shoes and adapted to be actuated by the follower acting member at the end opposite the coacting movement resisting means to be moved thereby, said pairs of shoes cooperating respectively with the two sets of shell friction surfaces.

13. In a friction shock absorbing mechanism, the combination with front and rear follower acting means; of a friction shell interposed between said follower acting means, said shell having a plurality of longitudinally disposed, interior friction surfaces; two sets of friction shoes cooperating with the shell friction surfaces; tandem arranged springs interposed between said front and rear follower-acting means and co-operating respectively with the two sets of friction shoes; and a wedge engaging each set of friction shoes, each wedge adapted to be moved by the follower acting means at the end opposite the coacting tandem spring during compression of the mechanism.

14. In a friction shock absorbing mechanism, the combination with front and rear follower acting means; of a friction shell interposed between said front and rear follower acting means, said shell having a plurality of longitudinally disposed interior friction surfaces, tandem arranged springs interposed between said follower acting means; a spring follower co-operating with each spring; two sets of friction shoes cooperating with the shell friction surfaces, each set co-operating with one of said spring followers; and wedge means engaging the friction shoes of each set, each wedge means adapted to be actuated by the main follower acting means at the end opposite the coacting tandem spring during compression of the mechanism.

15. In a friction shock absorbing mechanism, the combination with front and rear follower acting members; of tandem arranged springs interposed between said follower acting members and having their outer ends co-operating with the respective follower acting members; and means for transmitting pressure from the front and rear follower acting members to the inner ends of the tandem arranged springs respectively, said means including relatively movable friction elements, a floating friction member with which said elements co-operate and separate means for moving said friction elements longitudinally of the mechanism relatively to each other and relatively to said floating friction member, each of said means adapted to be actuated by the follower acting member at the end opposite the coacting tandem spring.

16. In a friction shock absorbing mechanism, the combination with a pair of relatively movable followers; of tandem arranged springs co-acting with said followers one of said tandem springs being actuated by each follower; and a friction wedge system interposed between said followers, said system including a floating friction member, relatively movable wedge friction shoes co-operating with said friction member; and wedge means movable with the respective followers and co-operating with said shoes, each of said wedge means being actuated by the follower at the end opposite the co-acting tandem spring to effect relative movement of said shoes.

17. In a friction shock absorbing mechanism, the combination with a pair of relatively movable follower shells; of tandem arranged springs within said shells; a floating friction column; friction shoes co-acting with said column and having their relative movement resisted by said tandem springs; and wedge means movable relatively by said follower shells engaging said shoes, each of said means being actuated by the follower shell at the end opposite the coacting tandem spring to effect relative movement of said shoes.

In witness that I claim the foregoing I have hereunto subscribed my name this 8th day of July, 1924.

JOHN F. O'CONNOR.